(12) United States Patent
Kuo et al.

(10) Patent No.: US 7,551,249 B2
(45) Date of Patent: Jun. 23, 2009

(54) TRANSFLECTIVE PIXEL STRUCTURE AND FABRICATING METHOD THEREOF

(75) Inventors: Chien-Chung Kuo, Taichung County (TW); Chien-Chung Chen, Taichung (TW); Chin-Pei Hwang, Taichung (TW); Chin-Chang Liu, Taichung County (TW)

(73) Assignee: Wintek Corporation, Taichung (TW)

( * ) Notice: Subject to any disclaimer, the term of this patent is extended or adjusted under 35 U.S.C. 154(b) by 201 days.

(21) Appl. No.: 11/780,697

(22) Filed: Jul. 20, 2007

(65) Prior Publication Data

US 2009/0021676 A1 Jan. 22, 2009

(51) Int. Cl.
*G02F 1/1343* (2006.01)
(52) U.S. Cl. .................................. 349/114; 349/105
(58) Field of Classification Search .................. None
See application file for complete search history.

(56) References Cited

U.S. PATENT DOCUMENTS

| 5,753,937 | A  | * | 5/1998 | Shimomaki et al. ........... 257/59 |
| 6,097,456 | A  | * | 8/2000 | Wang ........................ 349/105 |
| 6,771,338 | B2 | * | 8/2004 | Wang ........................ 349/114 |
| 7,019,803 | B2 | * | 3/2006 | Ashida et al. ................ 349/114 |
| 2002/0044240 | A1 | * | 4/2002 | Choo et al. ................. 349/113 |
| 2002/0175335 | A1 | * | 11/2002 | Lim .............................. 257/83 |
| 2005/0140867 | A1 |   | 6/2005 | Choi ........................... 349/114 |
| 2007/0002197 | A1 | * | 1/2007 | Chiu et al. .................... 349/43 |
| 2007/0290213 | A1 | * | 12/2007 | Kobayashi ..................... 257/79 |
| 2008/0303993 | A1 | * | 12/2008 | Kuo et al. ................... 349/114 |

FOREIGN PATENT DOCUMENTS

| JP | 2004-029400 |   | 1/2004 |
| KR | 2001-0017383 A | * | 3/2001 |
| TW | 200415410 |   | 8/2004 |
| WO | WO03073157 |   | 9/2003 |

\* cited by examiner

*Primary Examiner*—Mike Stahl
(74) *Attorney, Agent, or Firm*—J.C. Patents

(57) ABSTRACT

A transflective pixel structure suitable for being disposed on a substrate is provided. The transflective pixel structure includes a gate, a gate insulator, a channel layer, a transflective conductive layer, a passivation layer, and a second transflective film. The gate is disposed on the substrate and the gate insulator is disposed on the substrate to cover the gate. The channel layer is disposed on the gate insulator and located above the gate. The transflective conductive layer is disposed on part of the channel layer and part of the gate insulator. The passivation layer is disposed on the transflective conductive layer and part of the channel layer, and the second transflective film is disposed on part of the passivation layer. The transflective conductive layer includes a source, a drain, and a first transflective film connected to the drain. Besides, the second transflective film is located above the first transflective film.

23 Claims, 12 Drawing Sheets

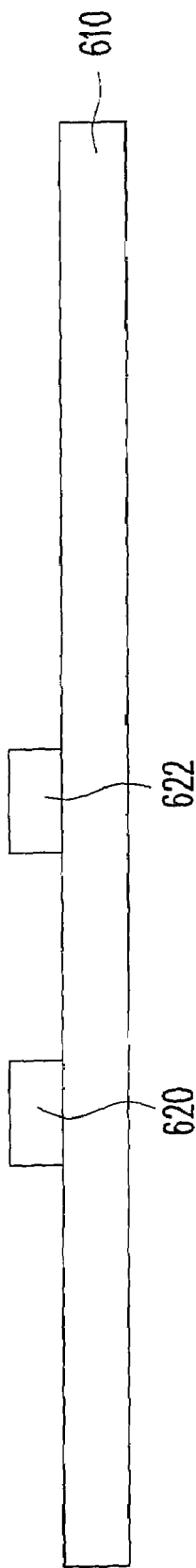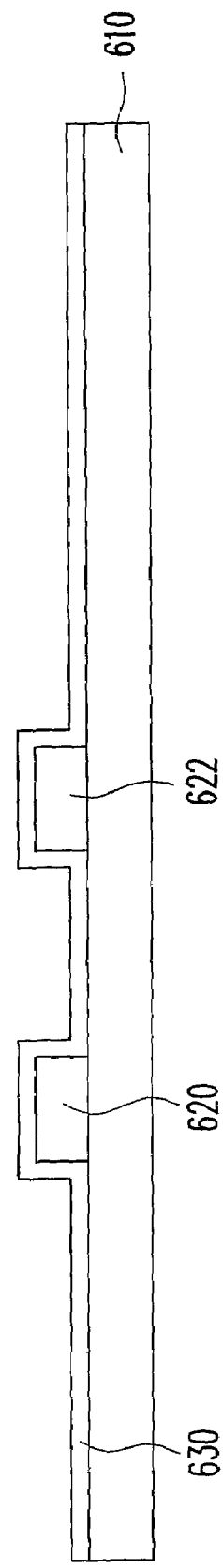

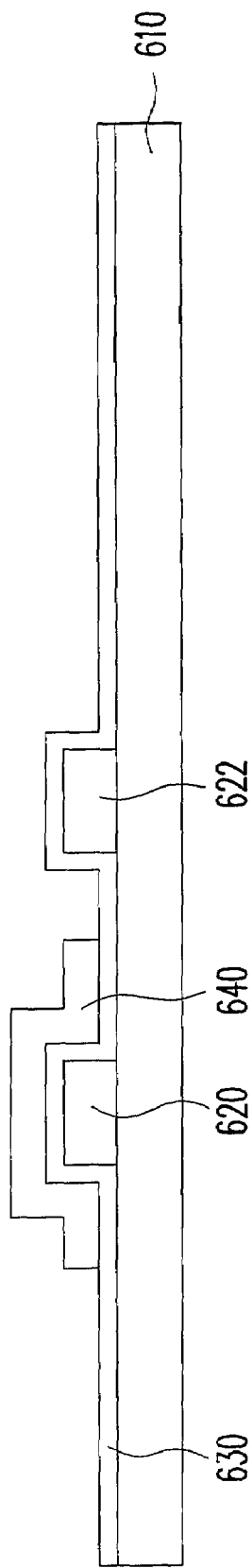
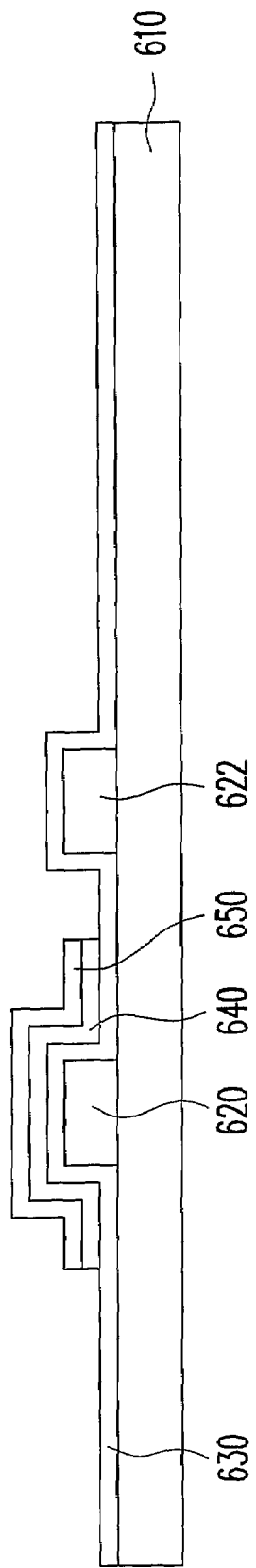
FIG. 6C
FIG. 6D

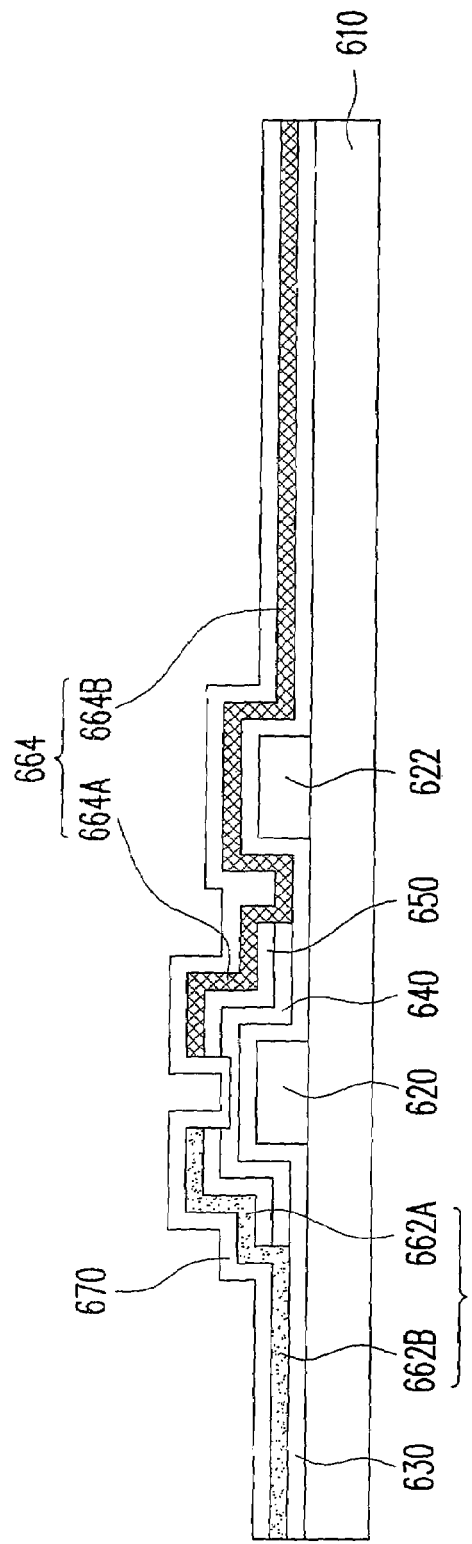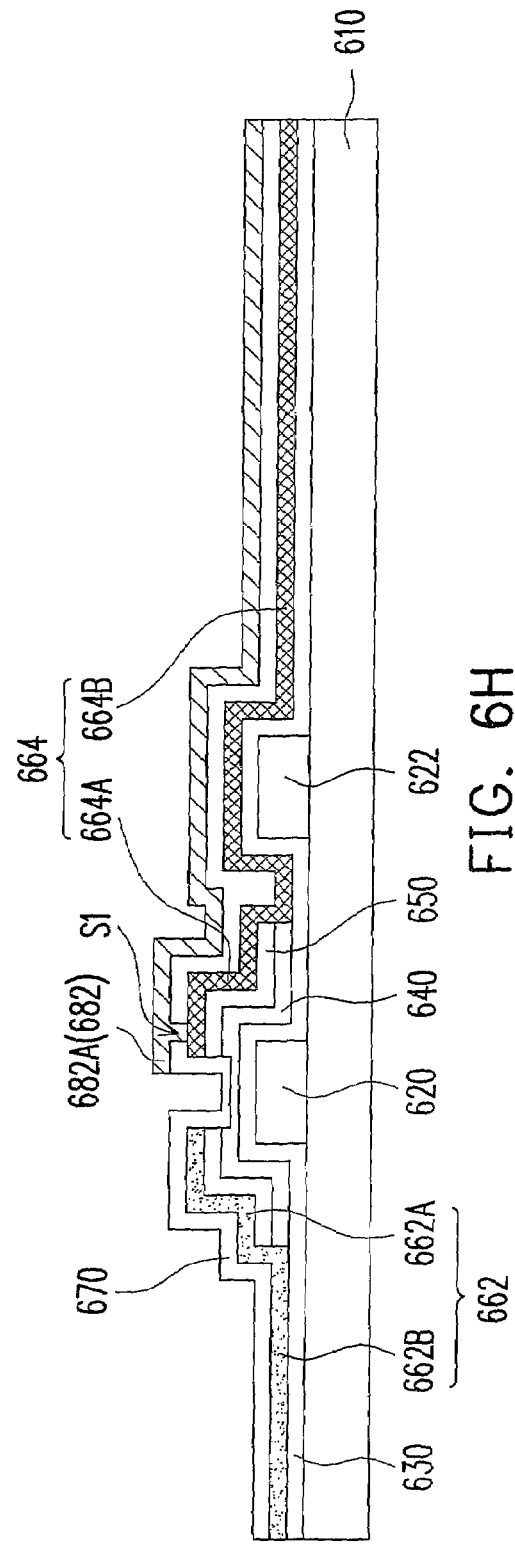

TRANSFLECTIVE PIXEL STRUCTURE AND FABRICATING METHOD THEREOF

BACKGROUND OF THE INVENTION

1. Field of the Invention

The present invention relates to a pixel structure and a fabricating method thereof. More particularly, the present invention relates to a transflective pixel structure and a fabricating method thereof.

2. Description of Related Art

Nowadays, along with the great advancement of computer performance and the rapid development in Internet and multimedia technologies, the transmission of image information has been converted from analog signal transmission into digital signal transmission, and to meet customers' requirement, today's video or image apparatuses have become light, thin, and small. Conventional cathode ray tube (CRT) display has been leading the display market in recent years due to its excellent display quality and low cost. However, along with the rising consciousness of environmental conservation in recent years, CRT display has become unsatisfactory for it cannot meet the requirements of lightness, slimness, shortness, smallness, and low power consumption due to its high power consumption, high radiation, and its limitation in size reduction. Thus, flat panel displays based on optoelectronic technology and semiconductor manufacturing techniques, for example, liquid crystal display (LCD), organic light emitting diode (OLED), or plasma display panel (PDP), have become the mainstream of display market.

As described above, LCDs can be categorized into reflective LCD, transmissive LCD, and transflective LCD according to light source utility patterns thereof. For example, a transmissive or transflective LCD is mainly composed of a liquid crystal panel and a backlight module (B/L). Since the liquid crystal filled in the liquid crystal panel does not emit light itself, the backlight module has to provide a light for illuminating the liquid crystal panel so that the LCD can display images.

FIG. 1 is a diagram of a conventional transflective liquid crystal display (LCD) panel. Referring to FIG. 1, the LCD panel 100 includes an upper substrate 110, a lower substrate 120, a transflective plate 130, a liquid crystal layer 140, a pixel electrode 150, and a common electrode 160. The upper substrate 110 and the lower substrate 120 are opposite to each other. The liquid crystal layer 140 is disposed between the upper substrate 110 and the lower substrate 120, and the transflective plate 130 is disposed on the lower substrate 120. The pixel electrode 150 is disposed on the transflective plate 130. The pixel electrode 150 and the common electrode 160 disposed on the upper substrate 110 are used for modulating the arrangement of the liquid crystal layer 140. Besides, the transflective plate 130 reflects part of the external light and also allows part of the light provided by the backlight module (not shown) to pass through. Accordingly, the LCD panel 100 can perform both transmissive and reflective displays. However, the transmittance and reflectivity of the LCD panel 100 are limited by the transflective plate 130, and a color filter 170 still has to be disposed on the upper substrate 110 to provide colorful display. Thus, the LCD panel 100 has such disadvantages as insufficient brightness and low backlight utility.

FIG. 2 is a diagram of another conventional transflective LCD panel. Referring to FIG. 2, the LCD panel 200 includes an upper substrate 210, a lower substrate 220, a liquid crystal layer 240, a pixel electrode 250, and a common electrode 260. The various components of the LCD panel 200 are similar to those of the LCD panel 100, therefore similar numeral references are used and not described herein. The difference between the two LCD panels is that in the LCD panel 200, a reflective plate 230 is also disposed on part of the lower substrate 220 in order to define a reflective region R, and the region without the reflective plate 230 is a transmissive region T. The liquid crystal layer 240 is disposed between the upper substrate 210 and the lower substrate 220. The LCD panel 200 has a reflective display mode and a transmissive display mode. While displaying with only the reflective display mode, only the reflective region R in the LCD panel 200 displays. On the other hand, while displaying with only the transmissive display mode, only the transmissive region T in the LCD panel 200 displays. In short, the LCD panel 200 has very low aperture ratio in a single display mode, and accordingly the backlight utility and display quality of the LCD panel 200 are unsatisfying. Similarly, a color filter 270 has to be disposed on the substrate to provide colorful display, thus, light transmittance is low and the display quality of the LCD panel 200 is affected.

The backlight utility and aperture ratio of an existing transflective LCD have to be improved in order to allow the transflective LCD to provide better display quality.

SUMMARY OF THE INVENTION

Accordingly, the present invention is directed to a transflective pixel structure for improving unsatisfying display performance of transflective LCD.

The present invention provides a transflective pixel structure which is suitable for being disposed on a substrate. The transflective pixel structure includes a gate, a gate insulator, a channel layer, a transflective conductive layer, a passivation layer, and a second transflective film. The gate is disposed on the substrate while the gate insulator is also disposed on the substrate and covers the gate. The channel layer is disposed on the gate insulator and is located above the gate. The transflective conductive layer is disposed on part of the channel layer and part of the gate insulator. The passivation layer is disposed on the transflective conductive layer and part of the channel layer, and the second transflective film is disposed on part of the passivation layer. The transflective conductive layer includes a source, a drain, and a first transflective film connected to the drain. Besides, the second transflective film is located above the first transflective film.

According to an embodiment of the present invention, the material of the transflective conductive layer includes silver. The thickness of the first transflective film may be between 10 nm and 60 nm, and the thickness of the second transflective film may also be between 10 nm and 60 nm.

According to an embodiment of the present invention, the second transflective film includes a conductive layer. Besides, the passivation layer may have a first opening for electrically connecting the transflective conductive layer and the conductive layer. Moreover, the material of the conductive layer includes silver or silver alloy.

According to an embodiment of the present invention, the transflective pixel structure further includes a capacitor-bottom electrode disposed on the substrate, wherein the capacitor-bottom electrode and the first transflective film may form a storage capacitor.

According to an embodiment of the present invention, the transflective pixel structure further includes an Ohmic contact layer disposed on part of the channel layer.

According to an embodiment of the present invention, the material of the passivation layer may be a dielectric material such as $SiO_2$, $Si_3N_4$, or SiON. According to an embodiment of the present invention, when the material of the passivation layer is $SiO_2$, the thickness of the passivation layer may be respectively between 5 nm and 120 nm, 120 nm and 145 nm, and 145 nm and 190 nm so that a light can respectively present blue, green, and red color through the transflective pixel structure. On the other hand, when the material of the passivation layer is $Si_3N_4$, the thickness of the passivation layer may be adjusted to be respectively between 5 nm and 70 nm, 70 nm and 95 nm, and 95 nm and 120 nm so that the light can respectively present blue, green, and red color through the transflective pixel structure.

The present invention further provides a transflective pixel structure which is suitable for being disposed on a substrate. The transflective pixel structure includes a gate, a gate insulator, a channel layer, a metal layer, a transflective conductive layer, a passivation layer, and a second transflective film. The gate is disposed on the substrate while the gate insulator is also disposed on the substrate and covers the gate. The channel layer is disposed on the gate insulator and is located above the gate. The metal layer is disposed on part of the channel layer, wherein the metal layer includes a source and a data line. The transflective conductive layer is disposed on part of the channel layer and part of the gate insulator, wherein the transflective conductive layer includes a drain and a first transflective film connected to the drain, and the transflective conductive layer and the metal layer respectively correspond to two sides of the gate. The passivation layer is disposed on the metal layer, the transflective conductive layer, and part of the channel layer. In addition, the second transflective film is disposed on part of the passivation layer, wherein the second transflective film is located above the first transflective film.

According to the transflective pixel structure in the present invention, a passivation layer is disposed between the second transflective film and the first transflective film and such a structure is adopted as an optical filter. Thus, the transflective pixel structure in the present invention can provide colorful display without any color filter. Meanwhile, since the transflective pixel structure in the present invention can perform both reflective and transmissive display without any opaque reflective plate, the transflective pixel structure has high aperture ratio. Moreover, in the fabricating method of transflective pixel structure provided by the present invention, the fabrications of the first transflective film, the second transflective film, and the passivation layer are compatible with existing fabricating processes so that the fabricating cost of the transflective pixel structure is reduced and the fabricating flow of such LCD panel is simplified.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A~6I illustrate a fabricating method of a transflective pixel structure according to another exemplary embodiment of the present invention.

DESCRIPTION OF EMBODIMENTS

Figure 1:
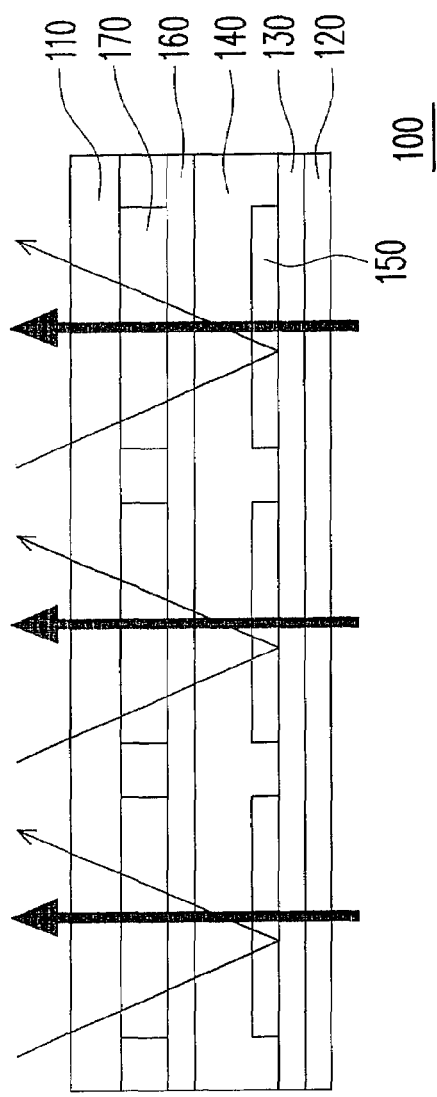
FIG. 1 is a diagram of a conventional transflective liquid crystal display (LCD) panel.
Figure 2:
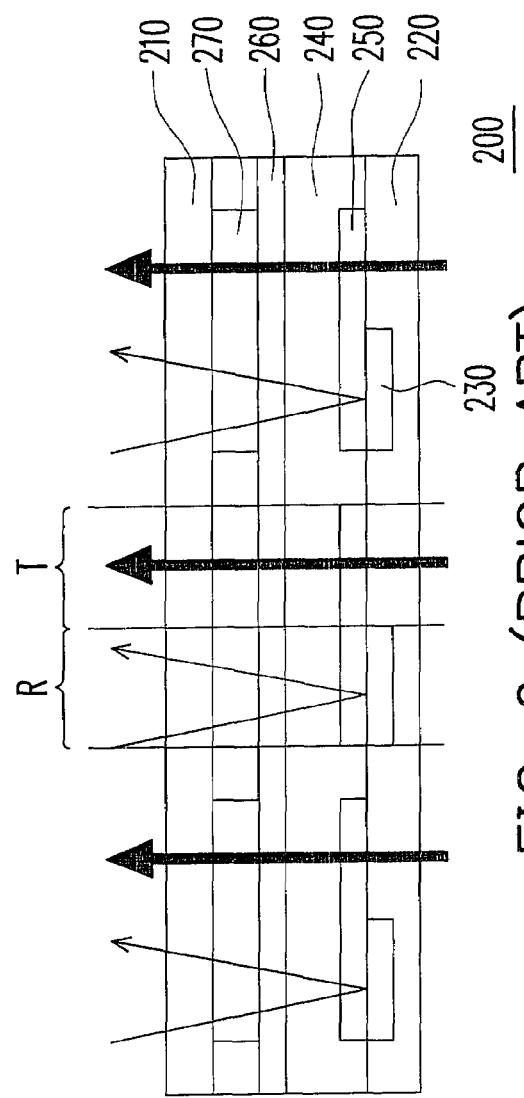
FIG. 2 is a diagram of another conventional transflective LCD panel.
Figure 3A:
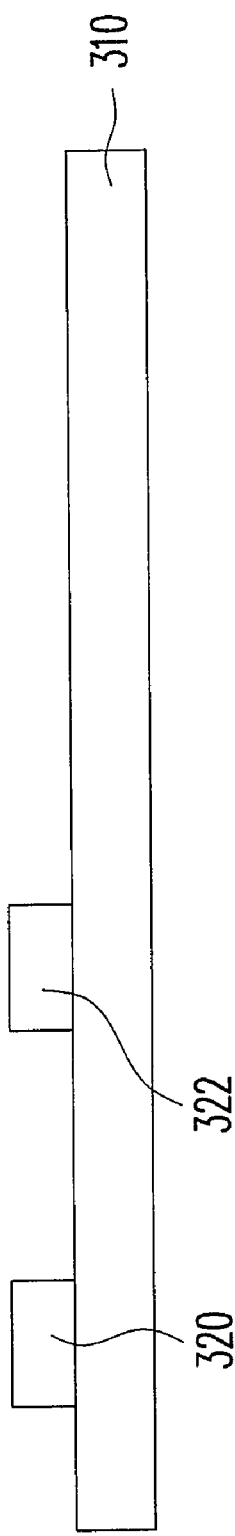
FIGS. 3A~3G illustrate a fabricating method of a transflective pixel structure according to an exemplary embodiment of the present invention.

FIGS. 3A~3G illustrate a fabricating method of a transflective pixel structure according to an exemplary embodiment of the present invention. Referring to FIG. 3A, a gate 320 is formed on the substrate 310, wherein the substrate 310 may be a glass substrate. The gate 320 may be formed by depositing a gate metal layer (not shown) on the substrate 310 through thin film deposition, and then patterning the gate metal layer through a photolithography and etching process. At the same time, a capacitor-bottom electrode 322 is formed on the substrate 310, and the capacitor-bottom electrode 322 is located at one side of the gate 320.

Figure 3B:
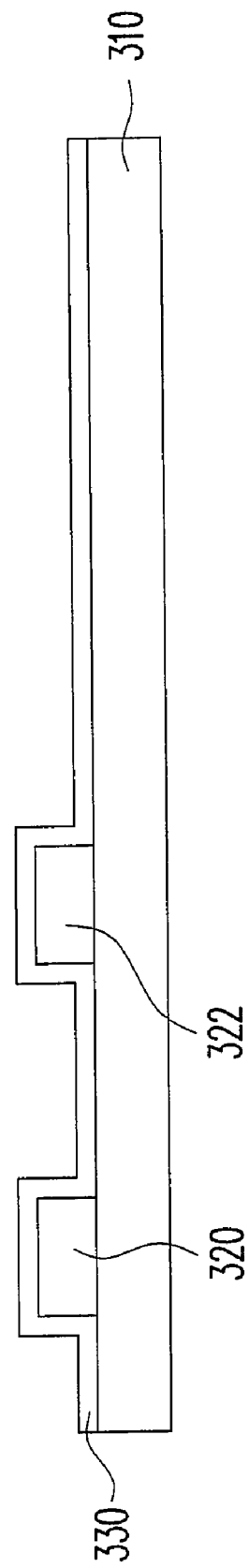

Next, referring to FIG. 3B, after forming the gate 320, a gate insulator 330 is formed on the substrate 310. As shown in FIG. 3B, the gate insulator 330 covers the gate 320 and the capacitor-bottom electrode 322. The gate insulator 330 may be formed by deposing a dielectric material on the substrate 310 through chemical vapor deposition (CVD). The material of the gate insulator 330 may be a dielectric material such as $SiO_2$, $Si_3N_4$, or SiON.

Figure 3C:
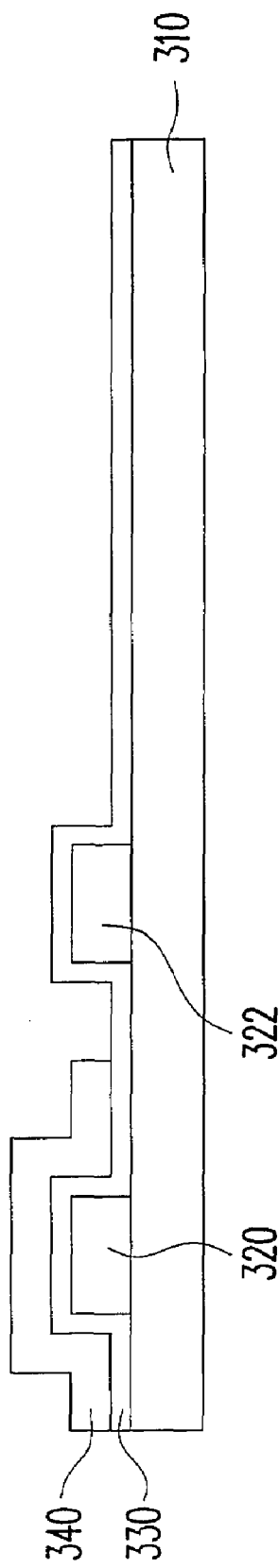

Referring to FIG. 3C, a channel layer 340 is then formed on the gate insulator 330, and the channel layer 340 is located above the gate 320. The channel layer 340 may be formed with following steps: depositing silicon on the gate insulator 330 through CVD, so as to form an amorphous silicon layer (not shown), or further performing laser annealing to the amorphous silicon layer in order to form a polysilicon layer (not shown); and then patterning the amorphous silicon layer or the polysilicon layer through photolithography so as to form the channel layer 340 above the gate 320.

Figure 3D:
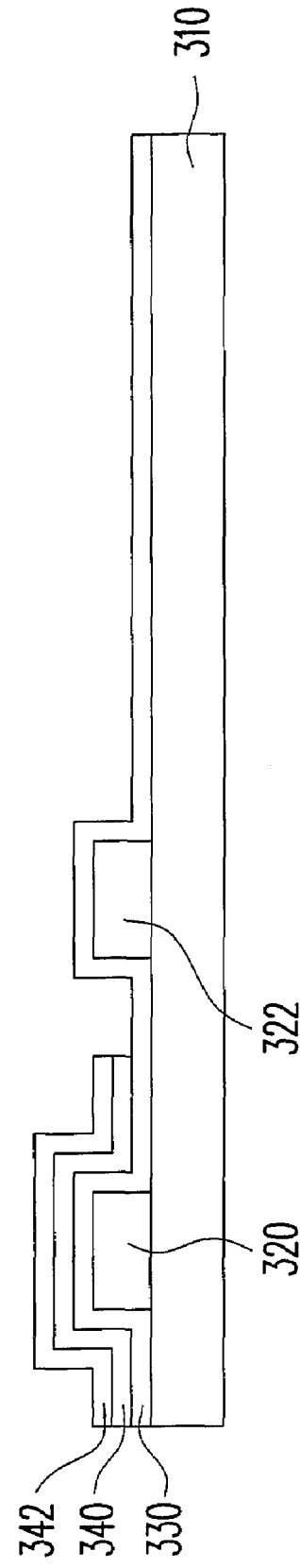

Generally speaking, to reduce the contact impedance between the source/drain and the gate of a thin film transistor (TFT), a doping process may be carried out on the surface of the channel layer 340 to form an Ohmic contact layer 342 (as shown in FIG. 3D) on the surface of the channel layer 340.

Figure 3E:
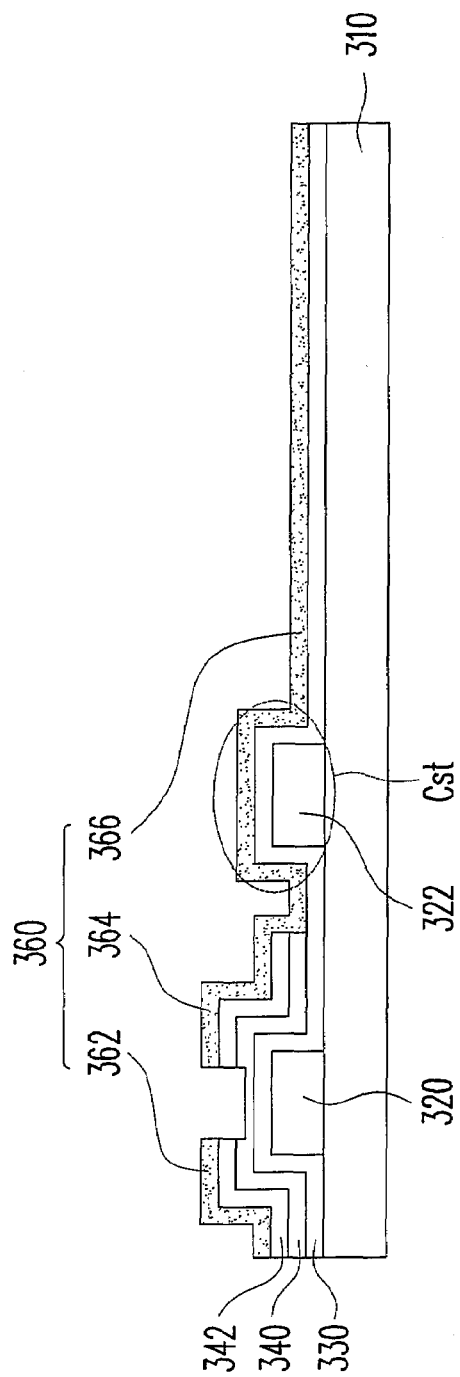

Next, referring to FIG. 3E, a transflective conductive layer 360 is formed on part of the channel layer 340 and part of the gate insulator 330. The transflective conductive layer 360 may be formed with following steps: depositing silver or silver alloy on the channel layer 340 and part of the gate insulator 330 through thin film deposition such as sputtering; and performing a patterning process to etch part of the silver or silver alloy layer and part of the Ohmic contact layer above the gate 320 and expose part of the channel layer 340. It should be noted that the transflective conductive layer 360 includes a source 362, a drain 364, and a first transflective film 366 connected to the drain 364. As shown in FIG. 3E, part of the first transflective film 366 and the capacitor-bottom electrode 322 form a storage capacitor Cst.

Figure 3F:
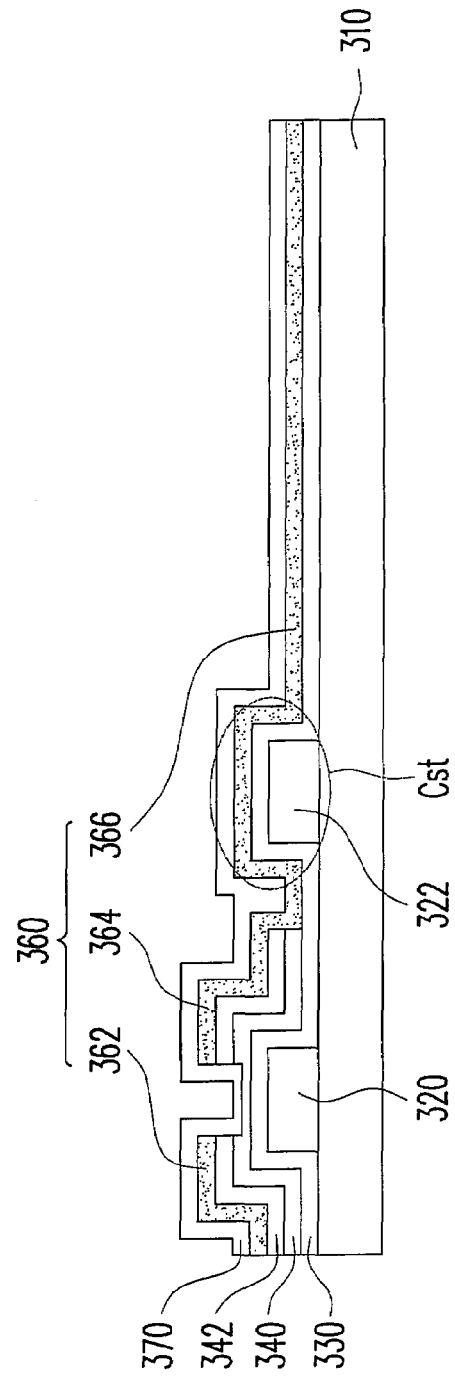

Next, referring to FIG. 3F, a passivation layer 370 is formed on the transflective conductive layer 360 and part of the channel layer 340. The passivation layer 370 may be a $SiO_2$, $Si_3N_4$, or SiON dielectric layer formed through CVD.

Figure 3G:
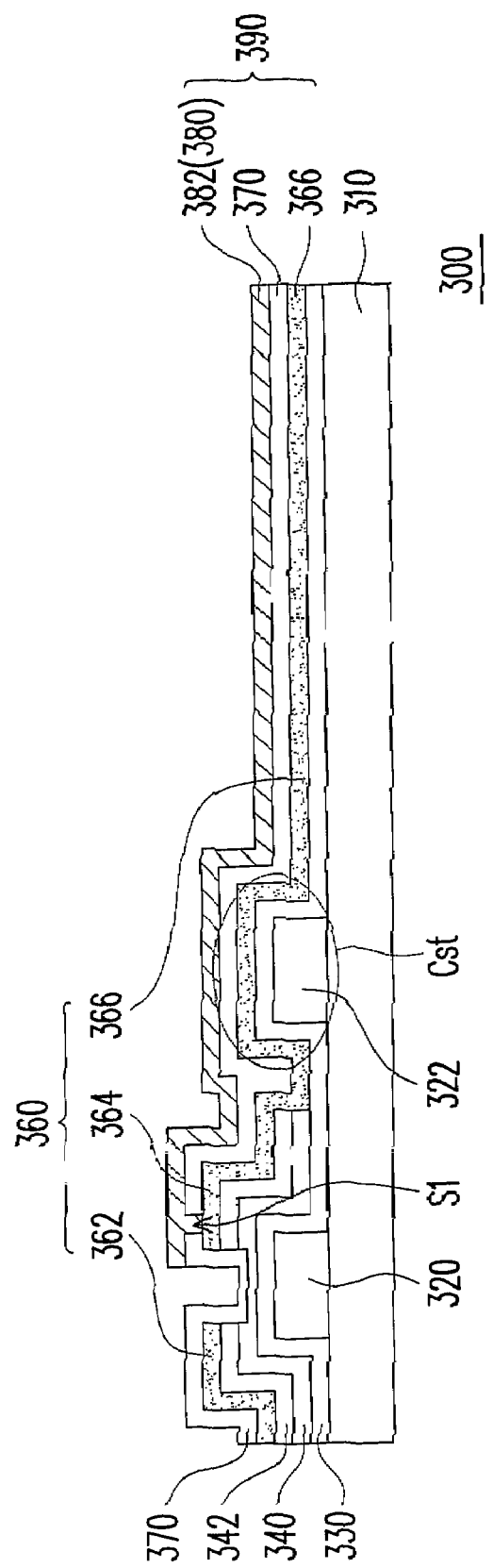

Next, referring to FIG. 3G, a second transflective film 380 is formed on part of the passivation layer 370, wherein the second transflective film 380 is located above the first transflective film 366. In the present embodiment, the second transflective film 380 may be a conductive layer 382, and the conductive layer 382 may be formed by depositing silver on the passivation layer 370 through thin film deposition, and then patterning the silver layer through photolithography so that the silver layer covers part of the passivation layer 370. Besides, to further prevent problems caused by the floating conductive layer 382, in the present embodiment, a first opening S1 is formed in the passivation layer 370 so that the conductive layer 382 is electrically connected to the drain 364 via the first opening S1. Since the conductive layer 382 is electrically connected to the drain 364, the conductive layer 382 can be used as a pixel electrode for supplying a voltage to the liquid crystal layer.

As shown in FIG. 3G, the pixel structure 300 in the present embodiment is suitable for being disposed on a substrate 310. The pixel structure 300 includes a gate 320, a gate insulator 330, a channel layer 340, a transflective conductive layer 360, a passivation layer 370, and a second transflective film 380. The gate 320 is disposed on the substrate 310 while the gate insulator 330 is also disposed on the substrate 310 and covers the gate 320. The channel layer 340 is disposed on the gate insulator 330 and is located above the gate 320. The transflective conductive layer 360 is disposed on part of the channel layer 340 and part of the gate insulator 330, wherein the transflective conductive layer 360 includes a source 362, a drain 364, and a first transflective film 366 connected to the drain 364. The passivation layer 370 is disposed on the transflective conductive layer 360 and part of the channel layer 340. The second transflective film 380 is disposed on part of the passivation layer 370, wherein the second transflective film 380 is located above the first transflective film 366.

In the present embodiment, there is an Ohmic contact layer 342 on the surface of the channel layer 340. The Ohmic contact layer 342 may be formed by performing ion doping to the upper surface of the channel layer 340 and is used form reducing the contact impedance between the source 362 (the drain 364) and the gate 320. The second transflective film 380 may be a conductive layer 382. Besides, the passivation layer 370 has a first opening S1, so that the transflective conductive layer 360 is electrically connected to the conductive layer 382 via the first opening S1. The material of the transflective conductive layer 360 and the conductive layer 382 includes silver, silver alloy, or other materials. The thickness of the drain 364 may be between 10 nm and 200 nm, and the thickness of the first transflective film 366 may be between 10 nm and 60 nm. Similarly, the thickness of the second transflective film 380 may be between 10 nm and 60 nm.

In the present embodiment, the pixel structure 300 further includes a capacitor-bottom electrode 322 disposed on the substrate 310, wherein the capacitor-bottom electrode 322 and part of the first transflective film 366 form a storage capacitor Cst. The storage capacitor Cst effectively maintains the voltage of the pixel electrode, and which helps to stabilize the display performance of the pixel structure 300.

It should be mentioned here that an optical filter 390 is formed by disposing a passivation layer 370 between the second transflective film 380 and the first transflective film 366, and this is because of the film interference produced by the second transflective film 380, the first transflective film 366, and the passivation layer 370. With such interference, the wavelength of the light passing through the optical filter 390 and the color thereof can be adjusted by adjusting the film thickness of the passivation layer 370. In other words, the pixel structure 300 can provide colorful display by adjusting the deposition thickness of the passivation layer 370.

To be specific, to present ideal display quality, the thickness of the passivation layer 370 (the dielectric film) may vary with the actual requirement and the material thereof. For example, if the passivation layer 370 is fabricated with $SiO_2$, a light presents blue color through the pixel structure 300 if the thickness of the passivation layer 370 is between 5 nm and 120 nm; the light presents green color through the pixel structure 300 if the thickness of the passivation layer 370 is between 120 nm and 145 nm; and the light presents red color through the pixel structure 300 if the thickness of the passivation layer 370 is between 145 nm and 190 nm. If the passivation layer 370 is fabricated with $Si_3N_4$, a light presents blue color through the pixel structure 300 if the thickness of the passivation layer 370 is between 5 nm and 70 nm; the light presents green color through the pixel structure 300 if the thickness of the passivation layer 370 is between 70 nm and 95 nm; and the light presents red color through the pixel structure 300 if the thickness of the passivation layer 370 is between 95 nm and 120 nm. Certainly, the passivation layer 370 may also be fabricated with other materials such as SiON.

When the pixel structure 300 is applied to a LCD panel, the pixel structure 300 can provide colorful display without any additional color filter. Accordingly, both the step and cost for fabricating a color filter are skipped, and furthermore, the brightness of an image displayed will not be affected by the light-absorbing function of the color filter, so that the display quality of LCD panel is improved.

Figure 4A:
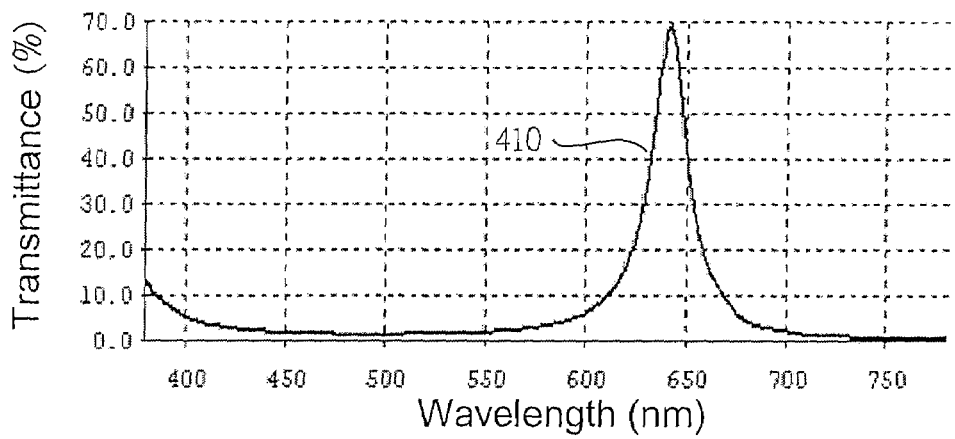
FIGS. 4A~4C are graphs illustrating the relationships between wavelengths and transmittances.
Figure 4B:
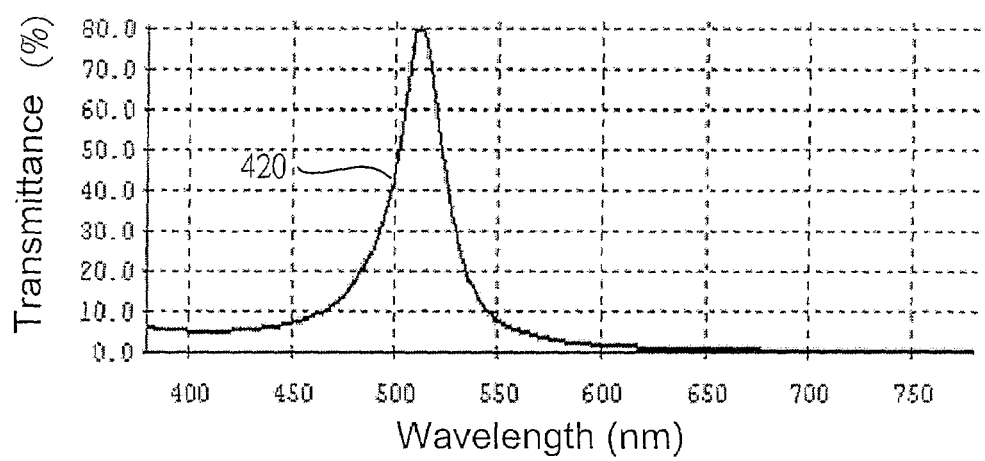
Figure 4C:
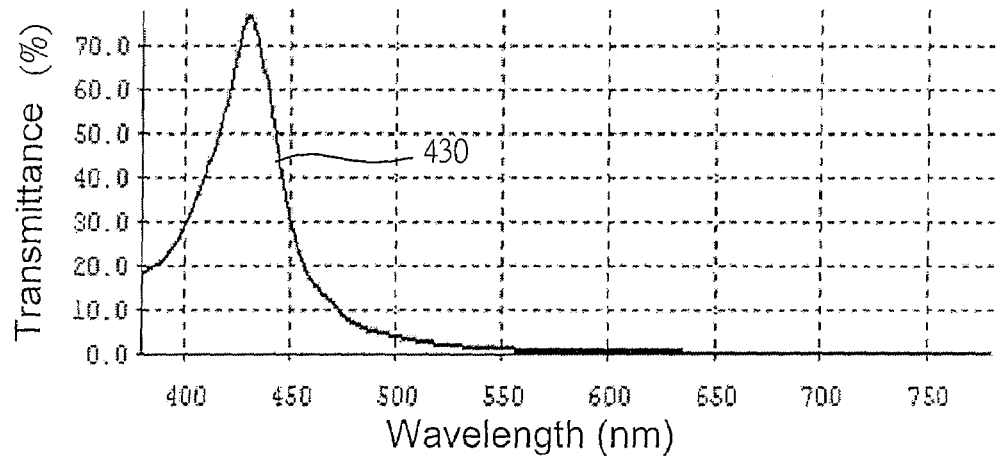

If the passivation layer 370 is fabricated with $Si_3N_4$, the relationships between wavelengths and transmittances of lights displayed by a pixel structure in the present invention are illustrated in FIGS. 4A~4C. Referring to FIGS. 4A~4C, the transmittances of the optical filter 390 to red, green, and blue light are respectively about 70%, 80%, and 75% (as shown by curves 410, 420, and 430). Thus, it can be seen that high transmittances can be maintained to lights of various colors by the optical filter 390.

In addition, in the pixel structure 300, various films of the optical filter 390 are composed of the related films in an active device, thus, coupling effect, and further unnecessary parasitic capacitor, won't be produced between those conductive films in the optical filter and the other conductive films. On the other hand, the fabrication of the optical filter 390 is compatible to existing process, therefore the fabricating cost thereof won't be increased and the fabricating process thereof is kept simple.

Figure 5:
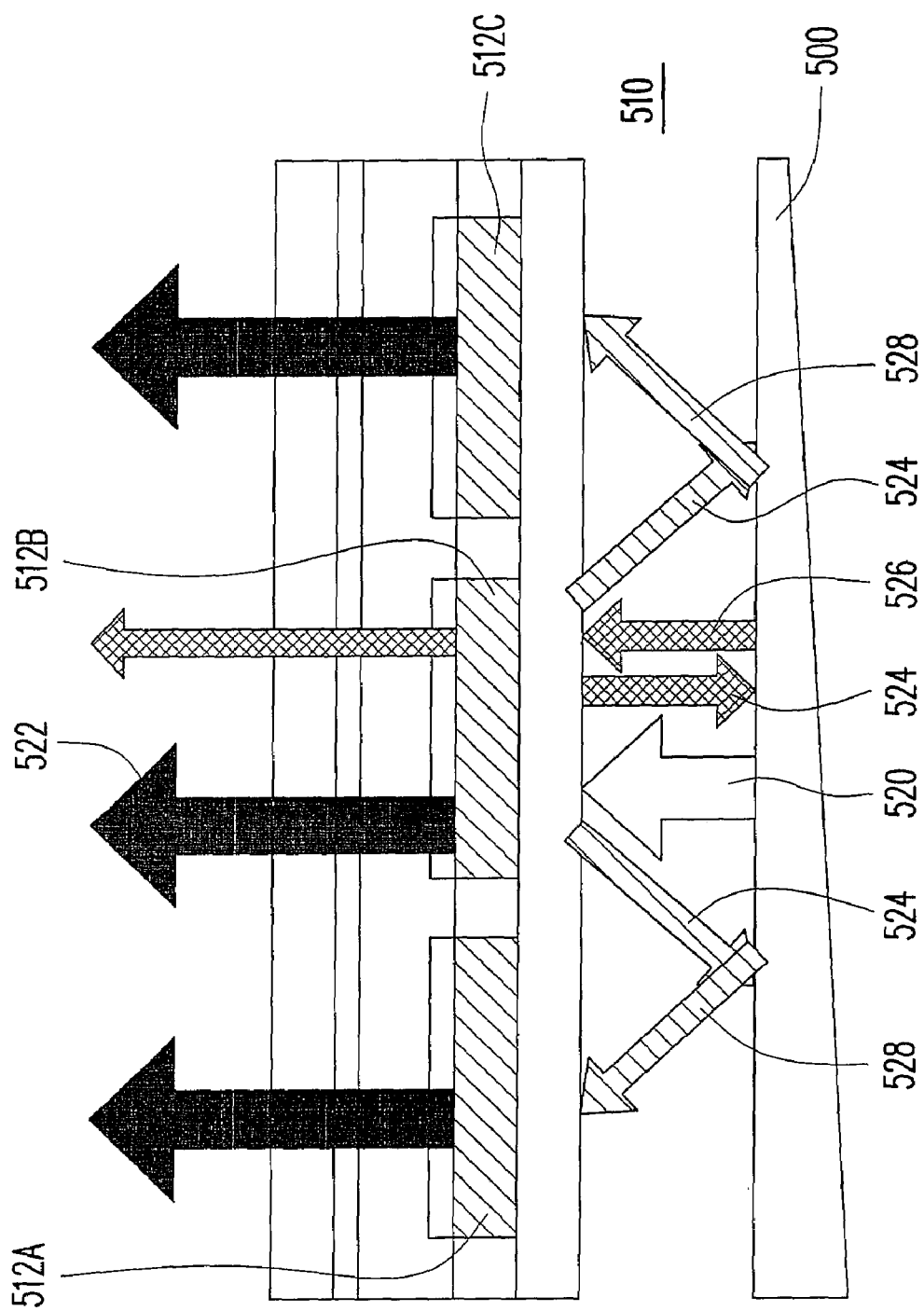
FIG. 5 illustrates the backlight utility of a LCD adopting the transflective pixel structure in the present invention.

It should be noted that the design of the pixel structure 300 in the present invention also helps to improve backlight utility. FIG. 5 illustrates the backlight utility of a LCD adopting the transflective pixel structure in the present invention. Referring to FIG. 5, generally speaking, the backlight module 500 is disposed below the LCD panel 510, and the LCD panel 510 has a plurality of pixel structures 512A, 512B, and 512C. The pixel structures 512A, 512B, and 512C may be pixel structures described in foregoing embodiment. The backlight module 500 provides sufficient light to the pixel structures 512A, 512B, and 512C in order to perform transmissive display. The pixel structure 512A may display red light, the pixel structure 512B may display green light, and the pixel structure 512C may display blue light. When a light 520 emitted by the backlight module 500 passes through the pixel structure 512B, light waves of various wavelengths in the light 520 are filtered by the optical filter in the pixel structure 512B so that part of green light 522 passes through the pixel structure 512B and light 524 of other wavelengths which cannot pass through the pixel structure 512B is reflected. In other words, the reflected light 524 is composed of red light, blue light, and part of green light which cannot pass through the pixel structure 512B. Light 526 in the light 524 will pass through the pixel structure 512B again for it is reflected directly. Besides, light 528 in the light 524 is reflected and transmitted transversely, and accordingly passes through another pixel structure 512A or 512C. Accordingly, light 526 improves the green light display performance of the pixel structure 512B, and light 528 improves respectively the red light and blue light display performance of the pixel structure 512A and the pixel structure 512C. Thus, light utility of the backlight module 500 is improved as a whole.

To form data line and source integrally and to fabricate the data line with other metal, the present invention provides another method for fabricating a transflective pixel structure, wherein the step of forming the data line and source metal layer is separated from the step of forming the transflective conductive layer. Meanwhile, the data line and the source are fabricated with other metal material in order to further improve the display performance of the LCD panel. This fabricating method will be described in detail below.

FIG. 6A~6I illustrate a fabricating method of a transflective pixel structure according to another exemplary embodiment of the present invention. The steps illustrated in FIGS. 6A~6D are the same as those shown in FIGS. 3A~3D, therefore will not be described herein. Some components of the transflective pixel structure have been formed on the substrate 610 up to the step in FIG. 6D, wherein the components include a gate 620, a gate insulator 630, a channel layer 640, and an Ohmic contact layer 650 on the surface of the channel layer 640. Besides, a capacitor-bottom electrode 622 has been disposed at one side of the gate 620.

Figure 6E:
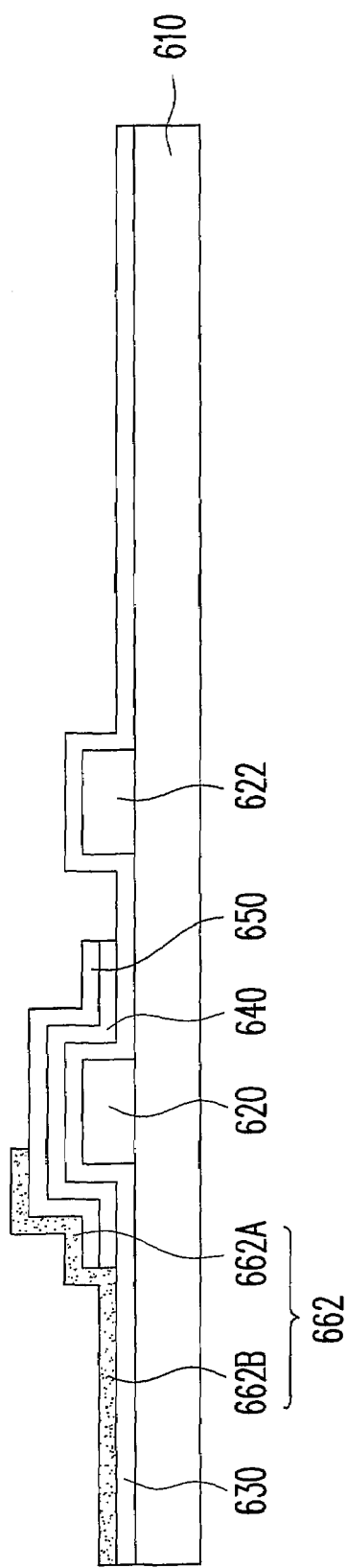

Next, referring to FIG. 6E, a metal layer 662 is formed on part of the channel layer 640, wherein the metal layer 662 includes a source 662A and a data line 662B. The metal layer 662 may be formed by depositing aluminum, molybdenum, or aluminum-molybdenum alloy on the channel layer 640 through thin film deposition and then patterning the aluminum, molybdenum, or aluminum-molybdenum alloy layer.

Figure 6F:
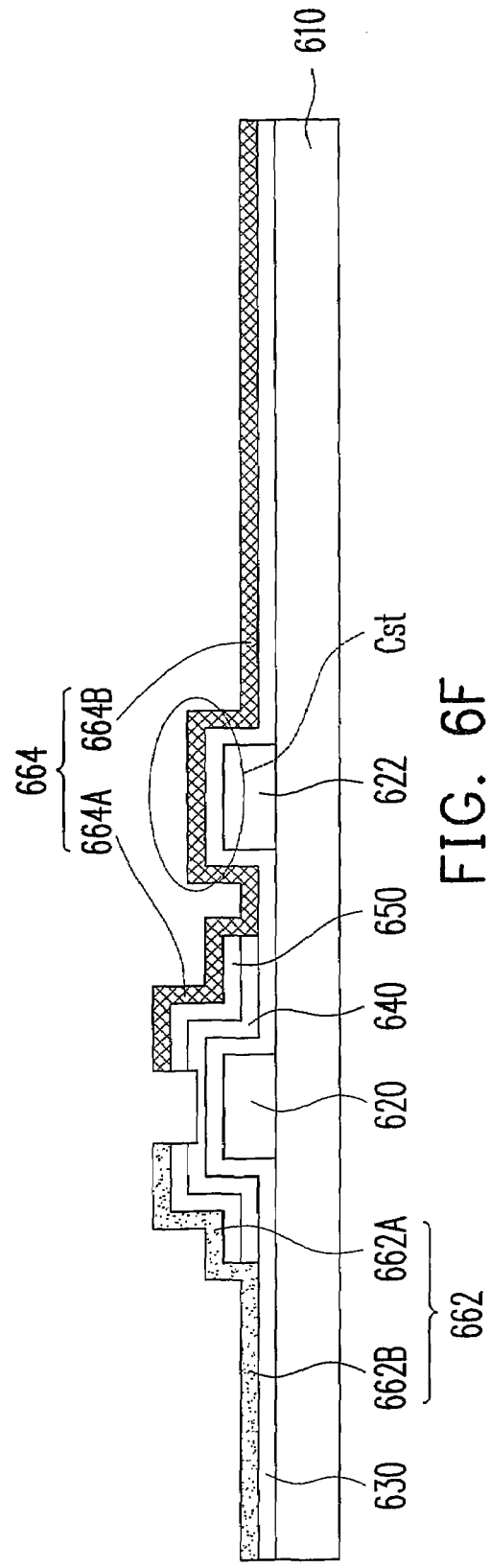

Next, referring to FIG. 6F, a transflective conductive layer 664 is formed on part of the channel layer 640 and part of the gate insulator 630, wherein the transflective conductive layer 664 includes a drain 664A and a first transflective film 664B connected to the drain 664A. In the present embodiment, the transflective conductive layer 664 may be formed by forming a silver layer (not shown) through sputtering and then patterning the silver layer. Actually, the transflective conductive layer 664 and the metal layer 662 are respectively corresponding to two sides of the gate 620. Besides, while forming the source 662A and the drain 664A, part of the Ohmic contact layer 650 is etched to expose part of the channel layer 640. The thickness of the drain 664A may be between 10 nm and 200 nm, and the thickness of the first transflective film 664B may be between 10 nm and 60 nm.

To be specific, part of the first transflective film 664B and the capacitor-bottom electrode 622 form a storage capacitor Cst which can maintain the voltage supplied to the pixel electrode effectively while the LCD displays images.

Thereafter, referring to FIG. 6G, a passivation layer 670 is formed on the metal layer 662, the transflective conductive layer 664, and part of the channel layer 640. The passivation layer 670 may be formed by depositing $SiO_2$, $Si_3N_4$, or SiON dielectric layers on the metal layer 662, the transflective conductive layer 664, and part of the channel layer 640 through CVD.

Moreover, referring to FIG. 6H, a second transflective film 682 is formed on part of the passivation layer 670, wherein the second transflective film 682 is located above the first transflective film 664B. The second transflective film 682 includes a conductive layer 682A, and the material of the conductive layer 682A includes silver or silver alloy. The thickness of the second transflective film 380 may be between 10 nm and 60 nm.

Since the second transflective film 682 is conductive and to prevent it from floating, a first opening S1 (as shown in FIG. 6H) may be further formed in the passivation layer 670 so that the conductive layer 682A can be electrically connected to the drain 664A via the first opening S1.

Figure 6I:
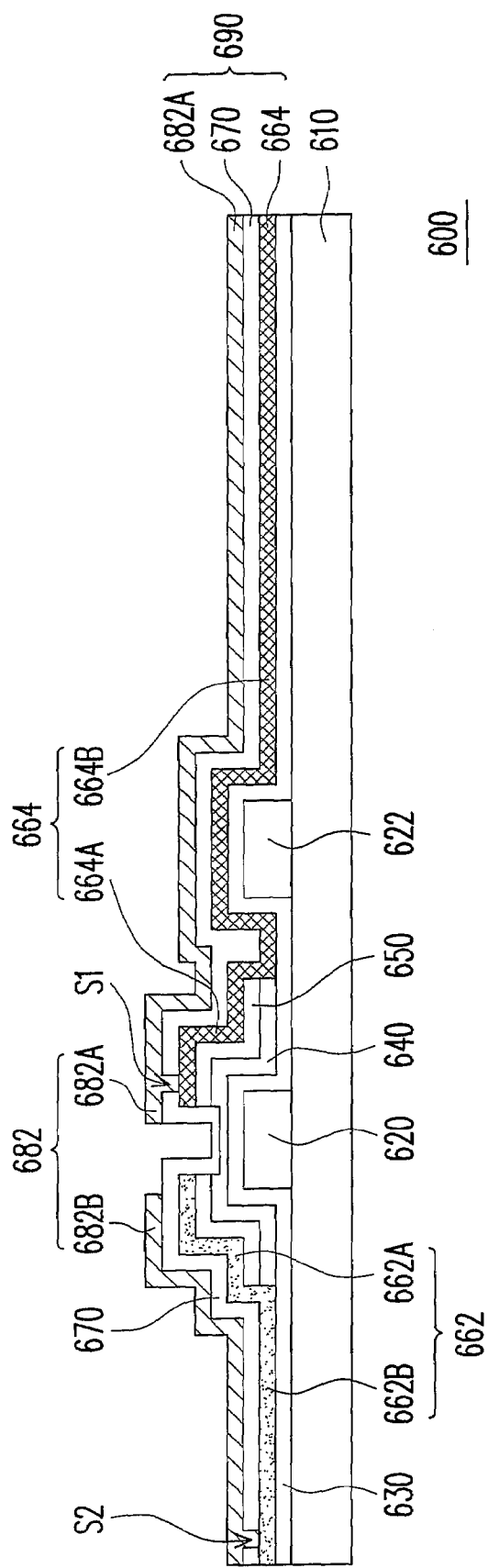

Moreover, referring to FIG. 6I, while forming the conductive layer 682A, an auxiliary data line 682B may be further formed on part of the passivation layer 670 so that the auxiliary data line 682B is located above the metal layer 662. Meanwhile a second opening S2 is formed in the passivation layer 670 for electrically connecting the auxiliary data line 682B and the data line 662B. Data transmission efficiency is improved for the auxiliary data line 682B and the data line 662B transmit data signals at the same time.

Referring to FIG. 6I again, the transflective pixel structure 600 disposed on the substrate 610 includes a gate 620, a gate insulating layer 630, a channel layer 640, a metal layer 662, a transflective conductive layer 664, a passivation layer 670, and a second transflective film 682. The gate 620 is disposed on the substrate 610, while the gate insulator 630 is also disposed on the substrate 610 and covers the gate 620. The channel layer 640 disposed on the gate insulator 630 is located above the gate 620. Besides, a metal layer 662 is disposed above one side of the channel layer 640, and a transflective conductive layer 664 is disposed above another side of the channel layer 640. The metal layer 662 includes a source 662A and a data line 662B, and the transflective conductive layer 664 includes a drain 664A and a first transflective film 664B covering part of the gate insulator 630. The passivation layer 670 is disposed on the metal layer 662, the transflective conductive layer 664, and part of the channel layer 640. The second transflective film 682 disposed on part of the passivation layer 670 is located above the first transflective film 664B.

In the present embodiment, the material of the metal layer 662 includes aluminum, molybdenum, or aluminum-molybdenum alloy, and the material of the transflective conductive layer 664 includes silver or silver alloy. The thickness of the drain 664A may be between 10 nm and 200 nm, the thickness of the first transflective film 664B may be between 10 nm and 60 nm, and the thickness of the second transflective film 682 may be between 10 nm and 60 nm.

The first transflective film 664B, the second transflective film 682, and the passivation layer 670 in between may form an optical filter 690. The optical filter 690 has the same function as the optical filter 390 in foregoing embodiment, namely, the pixel structure 600 can provide colorful display through film interference of the optical filter 690. To be specific, the pixel structure 600 displays red, green, and blue color by adjusting the film thickness of the passivation layer 670, and the design of the film thickness of the passivation layer 670 may be the same as that of the passivation layer 370 in foregoing embodiment, therefore will not be described herein.

The second transflective film 682 includes a conductive layer 682A. The conductive layer 682A is electrically connected to the first transflective film 664B via the first opening S1 in the passivation layer 670, so that the conductive layer 682A will not be floated. Besides, to further reduce the impedance of the data line 662B, in the present embodiment, the auxiliary data line 682B is disposed above the metal layer 662, and the auxiliary data line 682B is electrically connected to the data line 662B via the second opening S2 in the passivation layer 670.

The pixel structure 600 has all the advantages of the pixel structure 300. Besides, by fabricating the data line 662B and the source 662A separately with the metal layer 662, the transmission of data signals becomes more accurate. Moreover, the disposition of the auxiliary data line 682B further improves the performance of the LCD panel.

Furthermore, the pixel structures (300 and 600) in the present invention may be arranged variously on a substrate so as to form an active device array substrate, wherein the pixel structures (300 and 600) may be arranged on the substrate in strip pattern, mosaic pattern, triangle pattern, etc.

In summary, the transflective pixel structure and the fabricating method thereof in the present invention have at least following advantages:

1. According to the transflective pixel structure and the fabricating method thereof in the present invention, the pixel structure can emit lights of various colors (red, blue, or green) by only adjusting the thickness of the passivation layer.

2. According to the fabricating method of the transflective pixel structure in the present invention, the fabrication of the optical filter is compatible to existing process, so that the fabricating cost of the transflective pixel structure is not increased and the fabricating flow is not complicated.

3. According to the transflective pixel structure and the fabricating method thereof in the present invention, no reflective plate is disposed in the transflective pixel structure so that the LCD panel can have higher aperture ratio.

4. The transflective pixel structure in the present invention can provide colorful display without any color filter, so that the brightness of the displayed image will not be affected by the color filter.

5. According to the transflective pixel structure in the present invention, the light provided by the backlight module can be utilized effectively so that the display performance of the LCD panel can be further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transflective pixel structure, suitable for being disposed on a substrate, the transflective pixel structure comprising:
   a gate, disposed on the substrate;
   a gate insulator, disposed on the substrate, the gate insulator covering the gate;
   a channel layer, disposed on the gate insulator, wherein the channel layer is located above the gate;
   a transflective conductive layer, disposed on part of the channel layer and part of the gate insulator, wherein the transflective conductive layer comprises a source, a drain, and a first transflective film connected to the drain;
   a passivation layer, disposed on the transflective conductive layer and part of the channel layer; and
   a second transflective film, disposed on part of the passivation layer, wherein the second transflective film is located above the first transflective film.

2. The transflective pixel structure as claimed in claim 1, wherein the material of the transflective conductive layer comprises silver or silver alloy.

3. The transflective pixel structure as claimed in claim 1, wherein the thickness of the first transflective film and the second transflective film is between 10 nm and 60 nm, respectively.

4. The transflective pixel structure as claimed in claim 1, wherein the second transflective film comprises a conductive layer.

5. The transflective pixel structure as claimed in claim 4, wherein the material of the conductive layer comprises silver or silver alloy.

6. The transflective pixel structure as claimed in claim 1, further comprising a capacitor-bottom electrode disposed on the substrate, wherein the capacitor-bottom electrode and the first transflective film form a storage capacitor.

7. The transflective pixel structure as claimed in claim 1, wherein the material of the passivation layer comprises dielectric material.

8. The transflective pixel structure as claimed in claim 7, wherein the material of the passivation layer is $SiO_2$.

9. The transflective pixel structure as claimed in claim 8, wherein the thickness of the passivation layer is between 5 nm and 120 nm so that a light presents blue color through the transflective pixel structure; the thickness of the passivation layer is between 120 nm and 145 nm so that a light presents green color through the transflective pixel structure; and the thickness of the passivation layer is between 145 nm and 190 nm so that a light presents red color through the transflective pixel structure.

10. The transflective pixel structure as claimed in claim 7, wherein the material of the passivation layer is $Si_3N_4$.

11. The transflective pixel structure as claimed in claim 10, wherein the thickness of the passivation layer is between 5 nm and 70 nm so that a light presents blue color through the transflective pixel structure; the thickness of the passivation layer is between 70 nm and 95 nm so that a light presents green color through the transflective pixel structure; and the thickness of the passivation layer is between 95 nm and 120 nm so that a light presents red color through the transflective pixel structure.

12. A transflective pixel structure, suitable for being disposed on a substrate, the transflective pixel structure comprising:
   a gate, disposed on the substrate;
   a gate insulator, disposed on the substrate, wherein the gate insulator covers the gate;
   a channel layer, disposed on the gate insulator, wherein the channel layer is located above the gate;
   a metal layer, disposed on part of the channel layer, wherein the metal layer comprises a source and a data line;
   a transflective conductive layer, disposed on part of the channel layer and part of the gate insulator, wherein the transflective conductive layer comprises a drain and a first transflective film connected to the drain, and the transflective conductive layer and the metal layer respectively correspond to two sides of the gate;
   a passivation layer, disposed on the metal layer, the transflective conductive layer, and part of the channel layer; and
   a second transflective film, disposed on part of the passivation layer, wherein the second transflective film is located above the first transflective film.

13. The transflective pixel structure as claimed in claim 12, wherein the material of the metal layer comprises aluminum, molybdenum, or aluminum-molybdenum alloy.

14. The transflective pixel structure as claimed in claim 12, wherein the material of the transflective conductive layer comprises silver or silver alloy.

15. The transflective pixel structure as claimed in claim 12, wherein the second transflective film comprises a conductive layer.

16. The transflective pixel structure as claimed in claim 15, wherein the conductive layer further comprises a auxiliary data line disposed on part of the passivation layer, and the auxiliary data line is located above the metal layer.

17. The transflective pixel structure as claimed in claim 16, wherein the material of the conductive layer comprises silver or silver alloy.

18. The transflective pixel structure as claimed in claim 12, further comprising a capacitor-bottom electrode disposed on the substrate, wherein the capacitor-bottom electrode and the first transflective film form a storage capacitor.

19. The transflective pixel structure as claimed in claim 12, wherein the material of the passivation layer comprises dielectric material.

20. The transflective pixel structure as claimed in claim 19, wherein the material of the passivation layer is $SiO_2$.

21. The transflective pixel structure as claimed in claim 20, wherein the thickness of the passivation layer is between 5 nm and 120 nm so that a light presents blue color through the transflective pixel structure; the thickness of the passivation layer is between 120 nm and 145 nm so that a light presents green color through the transflective pixel structure; and the thickness of the passivation layer is between 145 nm and 190 nm so that a light presents red color through the transflective pixel structure.

22. The transflective pixel structure as claimed in claim 19, wherein the material of the passivation layer is $Si_3N_4$.

23. The transflective pixel structure as claimed in claim 22, wherein the thickness of the passivation layer is between 5 nm and 70 nm so that a light presents blue color through the transflective pixel structure; the thickness of the passivation layer is between 70 nm and 95 nm so that a light presents green color through the transflective pixel structure; and the thickness of the passivation layer is between 95 nm and 120 nm so that a light presents red color through the transflective pixel structure.

* * * * *